United States Patent [19]
Miyahara

[11] Patent Number: 5,494,623
[45] Date of Patent: Feb. 27, 1996

[54] METHOD OF DISPLAYING THE MOLDING DATA OF AN INJECTION MOLDING MACHINE

[75] Inventor: Kiyoshi Miyahara, Nagano, Japan

[73] Assignee: Nissei Plastic Industrial Co., Ltd., Nagano, Japan

[21] Appl. No.: 317,350

[22] Filed: Oct. 4, 1994

[51] Int. Cl.$^6$ .................................. B29C 45/76
[52] U.S. Cl. .................. 264/40.1; 264/328.1; 425/169
[58] Field of Search ................. 264/40.1, 328.1, 264/40.5; 425/135, 145, 149, 169, 170, 542; 364/476

[56] References Cited

U.S. PATENT DOCUMENTS

| | | | |
|---|---|---|---|
| 4,823,274 | 4/1989 | Kiya et al. | 364/476 |
| 5,316,707 | 5/1994 | Stanciu et al. | 425/169 |

FOREIGN PATENT DOCUMENTS

| | | |
|---|---|---|
| 60-247537 | 12/1985 | Japan . |
| 4-75808 | 12/1992 | Japan . |

Primary Examiner—Jill L. Heitbrink

[57] ABSTRACT

A time span ranging from the start of a plastic pellet weighing sub-cycle to the end of an injection sub-cycle is defined as one data cycle in preparation to present the molding data in an injection molding cycle on a display through the detection thereof. The whole molding data obtained via the detection during the one data cycle period are presented in a single cycle molding data indication frame on the monitor screen of the display, whereby the trouble on the part of a operator to misconceive the displayed molding data for those of another molded product may positively be prevented, and troubleshooting the causes of giving forth a defectively molded product may be done accurately and quickly.

4 Claims, 4 Drawing Sheets

FIG.2

| | NEWEST NUMERIC DATA | |
|---|---|---|
| INJECTION TIME | | sec |
| INJECTION START POSITION | 119.39 | mm |
| V/P CONTROL SHIFT POSITION | | mm |
| FORWARD STROKE LIMIT POSITION | | mm |
| INJECTION END POSITION | | mm |
| INJECTION STROKE | | mm |
| PEAK PLASTIC PRESSURE | | kg/cm² |
| PLASTICIZING TIME | 0.16 | sec |
| PLASTIC PELLET WEIGHING START POSITION | 25.65 | mm |

METHOD OF DISPLAYING THE MOLDING DATA OF AN INJECTION MOLDING MACHINE

FIELD OF THE INVENTION

The present invention relates to a method of presenting the molding data of an injection molding machine on a display upon detecting the data in an injection molding cycle.

DESCRIPTION OF THE RELEVENT ART

The conventional injection molding machines were each provided with a CRT display as disclosed in Japanese Patent Laid-Open Publication No. 4 (1992)-75808, whereby various molding data such as "cycle time", "injection time", "kneading time", "peak injection pressure", "shifted pressure", "degree of cushioning", and so forth in the injection molding cycle were displayed so that the operator might monitor present or past conditions of injection molding on the display.

The injection molding process for providing one molded product is normally referred to as comprising an injection molding cycle which ranges from the start of mold closing to the end of ejecting a molded product from inside a set of molds (see FIG. 1). So far, the presentation of molding data on a display used to take place with the whole molding data detected during one injection molding cycle presented as one molding cycle data in a single cycle molding data indication frame on the monitor screen of the display.

However, in the injection molding process of an injection molding machine, normally, the cooling sub-cycle wherein the plastic filled in a space within the molds is cooled, coincides with the weighing sub-cycle wherein plastic pellet weighing is carried out in preparation for the next injection molding cycle. Therefore, with the conventional method of data presentation in response to each of individual injection molding cycles, the molding data detected in the current injection molding cycle come to include separate molding data in the next injection molding cycle. For example, when "plasticizing time" and "plastic pellet weighing start position" are selected as respective items of molding data, the data of these items become the molding data of a product to be molded next, following the plastic pellet weighing sub-cycle, and these two itemized data become involved in the molding data of a product molded in the current injection molding cycle.

Therefore, when the operator takes a look at the value of the plasticizing time presented currently on a display upon noticing the occurrence of a product defectively molded from a short shot, etc. for example, he may sometimes be puzzled whether or not the displayed value corresponds precisely to the defectively molded product, or may likewise misread said numeral for those data seemingly concerned with the product molded in the current injection molding cycle, nevertheless said value is actually relative of the product to be molded in the subsequent injection molding cycle. As a result, the operator is thus subject to misconceive the displayed data and undergoes an interference with his accurate and quick troubleshooting of the causes behind the occurrence of defectively molded products.

SUMMARY OF THE INVENTION

An object of the present invention is to provide a method of presenting the molding data of an injection molding machine, wherein the misconception of displayed molding data for separate data in another injection molding cycle is positively prevented.

Another object of the present invention is to provide a method of presenting the molding data of an injection molding machine, wherein accurately and quickly troubleshooting the causes of defectively molding is allowed.

To achieve each or these objects, the presentation of the molding data in an injection molding cycle on display D is characterized in that a time span ranging from the start of a plastic pellet weighing sub-cycle to the end of an injection sub-cycle is defined as one data cycle period Td, and the whole molding data detected during said one data cycle period are presented in single molding cycle data indication frame Ds on the monitor screen of display D. In this case, the molding data available in one data cycle period Td include those data respectively of a plastic pellet weighing start position, a plasticizing time, an injection start position, peak plastic pressure, a speed/pressure control shift position, an injection time, a forward stroke limit position, an injection end position and an injection stroke. Prior to starting one data cycle period Td, the currently displayed one injection cycle molding data are loaded into a memory, followed by totally erasing the whole molding data presented in all numerical data presentation blocks provided in said frame, and thereafter, each of the molding data in a succeeding injection molding cycle is presented in every one of the numerical data presentation blocks, following the order of being detected and at an optional timing.

As in the foregoing, the time span from the period from the start of the plastic pellet weighing sub-cycle to the end of the injection sub-cycle is defined as one data cycle period Td. Accordingly, in single cycle molding data indication frame Ds on the monitor screen of display D, there are presented various molding data such as those respectively of "plastic pellet weighing start position", "plasticizing time", "injection start position", etc. which are detected from the start of the plastic pellet weighing sub-cycle—in the order of being detected for example and at an optional timing. As a consequence, in single cycle molding data indication frame, there are presented the molding data only of the product molded in the current injection molding cycle, whereby the trouble on the part of an operator to misread the displayed data for the molding data of a product to be molded in the next injection molding cycle, is prevented.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a front view showing the single molding cycle data indication frame on the monitor screen of a display on which the molding data are presented according to the present invention.

DETAILED DESCRIPTION OF THE PREFERRED EMBODIMENTS

Next, one of the preferred embodiments of the present invention quoted herein is described with reference to the accompanying drawings.

Figure 4:
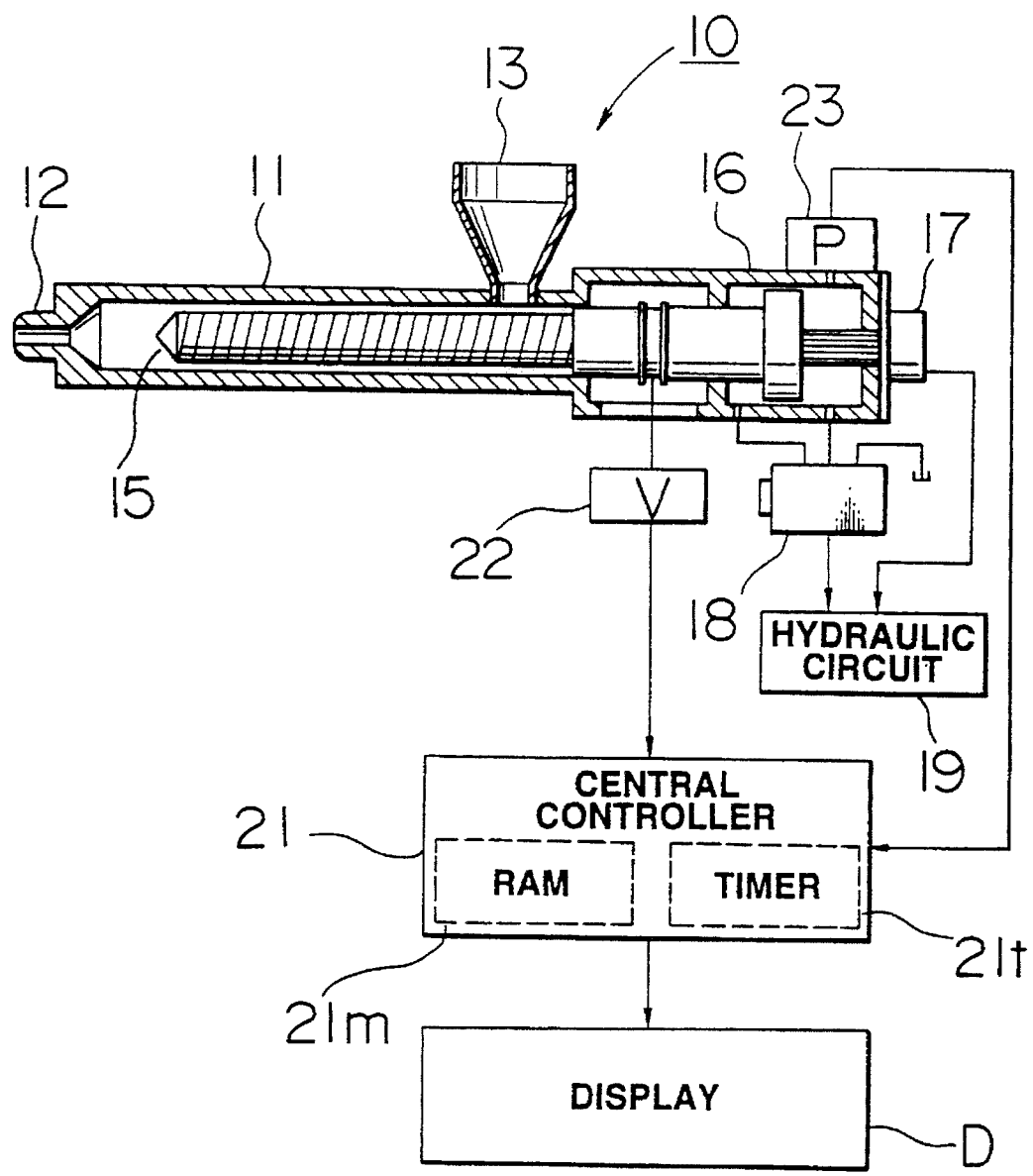
FIG. 4 is a sketch showing the rough structural constitution of an injection molding machine for which the method of data presentation of the present is applied.

To help understand the method of data presentation concerned with one preferred embodiment of the present invention, the rough structural constitution of an injection molding machine is described with reference to FIGS. 2 and 4.

An injection unit 10 of the injection molding machine is provided which includes a barrel cylinder 11 which is provided with an injection nozzle 12 and material feed hopper 13, respectively, at the fore and rear end. Barrel cylinder 11 incorporates screw 15 which is turned by an oil motor 17 while being driven forth and back with an injection cylinder 16. Injection cylinder 16 is coupled via changeover valve 18 to a hydraulic circuit 19 to which oil motor 17 is also joined.

Meanwhile, a central controller 21 is provided with computer functions, wherein there are provided not only RAM 21m and timer 21t but also various functional units such as a CPU, a ROM, etc. necessary for computer functioning and to which an input unit such as a keyboard or the like (omitted from being illustrated) is connected. Central controller 21 is provided with an injection molding machine operation sequence control function, and the ROM thereof stores a control program to work the method of data presentation to which the present invention relates.

Injection unit 10 is mounted with position sensor 22 to detect the position of the screw 15, which position sensor 22 is coupled to a central controller 21. In this case, screw speeds are obtained through differentiating the outcome of screw position detection within the central controller 21. Further, the injection cylinder 16 is installed with a pressure sensor 23 which is also coupled to the central controller 21.

Meanwhile, a CRT display or display D using a plasma cathode-ray tube, etc. is coupled to a central controller 21. Display D has a function to present various molding data available in the injection molding cycle of an injection molding machine. As shown in FIG. 2, the monitor screen of the display is provided with at least a single cycle molding data indication frame Ds. Single cycle molding data indication frame Ds comprises a series of blocks Dc in which are entered the respective items specifying each of categorized molding data such as "injection time", "injection start position", "V-P (speed/pressure) control shift position", "forward stroke limit position" of a screw, "injection end position", "injection stroke", "peak plastic pressure", "plasticizing time", "plastic pellet weighing start position" and their corresponding blocks Dd provided aside the data item-specifying said blocks and in which are filled Dc with the numerals quantitatively particularizing the respective itemized molding data.

Figure 1:
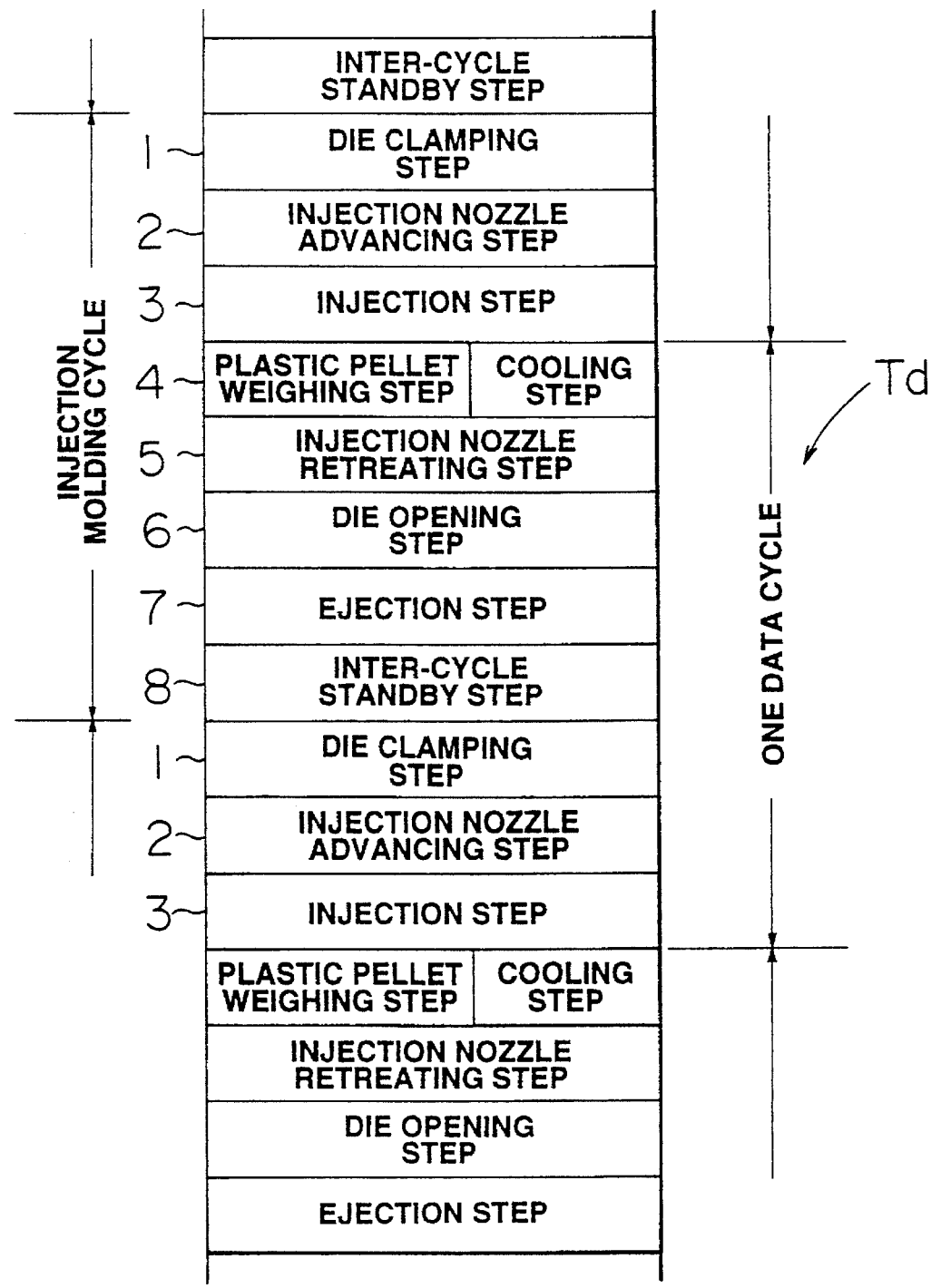
FIG. 1 is a diagram illustrating the principle of the method of data presentation to which the present invention relates.
Figure 3:
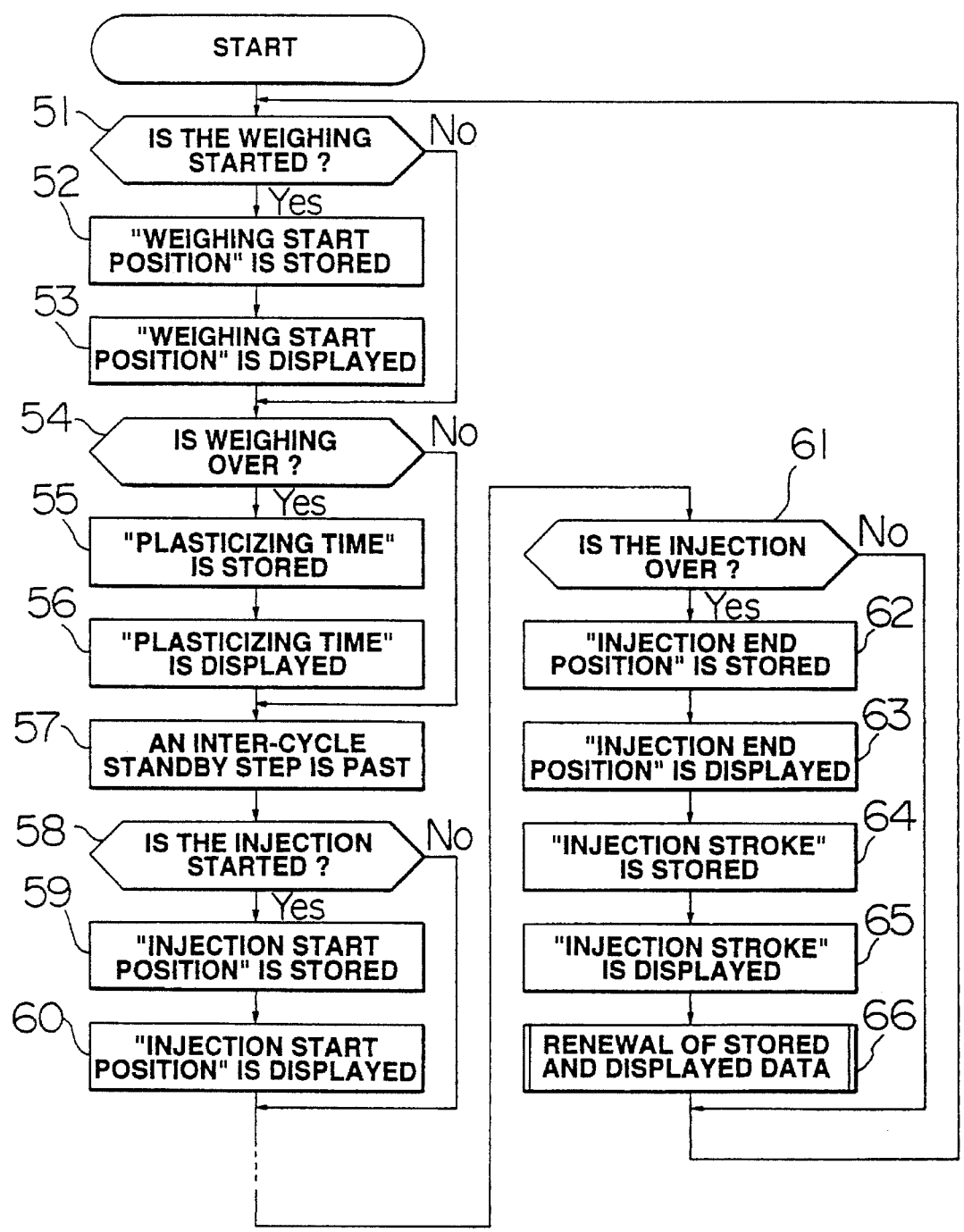
FIG. 3 is a flowchart illustrating the method of data presentation to which the present invention relates.

The method of data presentation to which the present invention relates is described in detail hereunder with reference to FIGS. 1 and 3.

First, referring to FIG. 1, the principle of the method of data presentation to which the present invention relates is illustrated. As referred to above, a series of in-process sub-cycles serving to provide one molded product are collectively called an injection molding cycle. As specified in FIG. 1, the injection molding cycle includes mold clamping sub-cycle 1, injection nozzle advancing sub-cycle 2, injection sub-cycle 3, plastic pellet weighing (cooling) sub-cycle 4, injection nozzle retreating sub-cycle 5, mold opening sub-cycle 6, ejection sub-cycle 7, and inter-cycle standby sub-cycle 8 extending over a given period from the preceding injection molding cycle to the succeeding injection molding to cycle. This injection molding cycle has its starting and ending point generally prescribed respectively at the start of the mold clamping sub-cycle and the end of the ejection sub-cycle. In the present invention, a new concept of a data cycle to collect the one injection molding cycle data is introduced in addition to the traditional, wherein a time span from the start of the plastic pellet weighing sub-cycle to the end of the injection sub-cycle is defined as one data cycle period Td which is used as a unit of time length during which one injection molding cycle data are detected, stored and displayed.

Next, following the flowchart in FIGS. 2 and 3, the method of data presentation to which the present invention relates is further described in detail.

In step with the start of one data cycle period, the data thus far presented in respective numerical data presentation blocks Dd are already through with total erasure, and the molding data (numerical data) in the subsequent injection molding cycle are presented therein in the order of being detected and at an optional timing.

When the plastic pellet weighing sub-cycle first starts, position sensor 22 serving to detect "plastic pellet weighing start position" sets about functioning, subsequently outputting one molding data related thereto and the data (25.65 mm in the present embodiment) output from the position sensor is then loaded into RAM 21m housed within central controller 21 while at the same time said data is presented (steps 51, 52, 53) in one numerical data presentation block Dd within a single cycle molding data indication frame Ds. Next, when the plastic pellet weighing sub-cycle is over, the molding data (0.16 sec. in the present embodiment) relative of "plasticizing time" which timer 21t incorporated in central controller 21 has counted is detected, followed by being stored in RAM 21m and simultaneously presented (steps 54, 55, 56) in another numerical data presentation block Dd. Thereafter, the machine has its operation sequence advanced to the injection sub-cycle when the inter-cycle standby sub-cycle of a given period (step 57) is over.

When the injection sub-step starts, position sensor 22 begins functioning, whereby the molding data (119.39 mm in the present embodiment) concerned with "injection start position," is detected and is loaded into RAM 21m, while simultaneously presented in a further numerical data presentation block Dd (steps 58, 59, 60). Though omitted from being illustrated in the flowchart in FIG. 3, the injection sub-cycle, the plastic pressure is monitored with reference to the detected value of pressure output from pressure sensor 23, whereby "peak plastic pressure" is detected, with position sensor 22 functioning to detect the position ("V/P (speed/pressure) control shift position") of shifting from speed control to pressure control, timer 21t counting up thereby to detect "injection time", position sensor 22 also working to detect "forward stroke limit position" of the screw, and with the respective data therefrom getting stored in the memory and presented on the display as in the foregoing.

On the other hand, as the injection sub-cycle expires, position sensor 22 starts functioning, whereby the molding data concerned with "injection end position" is detected and loaded into RAM 21m, getting simultaneously presented in one numerical data presentation block Dd steps 61, 62, 63). Further, the molding data relative of "injection stroke" is calculated according to the screw position detected by position sensor 22, followed by being loaded into RAM 21m and presented in one numerical data presentation block Dd (steps 64, 65, 66).

With these series of i steps completed, the collection of a set of molding data is over, and the whole molding data are presented in all numerical data presentation blocks Ds within single cycle molding data indication frame Ds. The numerals presented in these blocks are the data which have been gathered in one data cycle period Td, namely, the whole data are concerned with only one product molded in the current injection molding cycle. Therefore, when the operator reads the data "plasticizing time and "plastic pellet weighing start position" on the display, he will not be puzzled which of molded products is concerned with said data nor will misread said data respectively of "plasticizing time" and "plastic pellet weighing start position" for those of a separate molded product by accident.

Further, when gathering the molding data in one data cycle period Td is over, one injection molding cycle data thus far stored in RAM 21m are transferred to another memory, with RAM 21m getting thereby ready for loading another set of molding data due to be gathered in the subsequent one data cycle period, and also with said one injection molding cycle data so far presented in numeric data presentation blocks Dd getting erased. In this case, it is permissible that the molding data presented in said blocks Dd are maintained on the display. Namely, as a mode of data presentation, the whole molding data thus far presented in numeric data presentation blocks may be erased as in the present embodiment, with the presentation of another set of molding data detected in one succeeding data cycle period to follow at an optional timing or else even after the data collection in one subsequent data cycle, the whole molding data so far presented in the numeric data presentation blocks may be maintained therein but subject to replacement with new data at an optional timing, depending on whether or not there is a difference between each two former and new data.

In the foregoing, one preferred embodiment of the present invention has been described. However, it should be understood that the present invention is by no means limited only to this embodiment, and also that the data presentation methodic constitutional particularities, processes, and so forth may be altered optionally within the spirits and scope of the present invention.

I claim:

1. A data displaying method of an injection molding machine, for detecting a molding data at a time of a molding-operation to display the molding data on a displaying apparatus, comprising the following steps:

setting a period between a starting time of a measuring process to a finishing time of an injection process as a data cycle period for detecting a molding data for one time;

storing the molding data for one time displayed on a data displaying portion for a data displaying cycle before a start of a data cycle;

eliminating all displays of the data displaying portion; and displaying, at a predetermined time, all of the molding data detected during the data cycle period, on the data displaying portion in order of the detection.

2. The data displaying method of an injection molding machine, according to claim 1, wherein the molding data during the data cycle period includes a measurement starting position, a platicization time, an injection starting position, a peak of a resin pressure, a speed-pressure changing-over position, an injection time, the most advanced position, an injection finishing position, and an injection stroke.

3. The data displaying method of an injections molding machine as claimed in claim 1, wherein said molding data are displayed in the order of being detected and at a predetermined time.

4. The data, displaying method of an injection molding machine as claimed in claim 1, wherein the molding data in one data cycle period include those concerned with a plastic pellet weighing start position, a plasticizing time, an injection start position, an injection time, a forward stroke limit position, an injection end position, and an injection stroke.

* * * * *